United States Patent Office
3,423,380
Patented Jan. 21, 1969

3,423,380
ELASTOMERS HAVING A LOW COEFFICIENT
OF FRICTION
Gerald J. Tennenhouse, Oak Park, Mich., assignor to
General Motors Corporation, Detroit, Mich., a corporation of Delaware
No Drawing. Filed May 6, 1966, Ser. No. 548,049
U.S. Cl. 260—85.1    7 Claims
Int. Cl. C08d 13/26; C08c 17/24

ABSTRACT OF THE DISCLOSURE

Natural and synthetic resins selected from the group consisting of natural rubber, polyisoprene, polybutadiene and butadiene-styrene copolymer are treated with phosphorous pentafloride or boron trichloride to reduce the coefficient of friction of the elastomer surface.

---

This invention relates to a natural and certain synthetic resin elastomers and more specifically to a process for modifying the surface of such elastomers whereby the coefficient of friction of their surface is greatly reduced.

As is well known, various natural and synthetic elastomers such as natural rubber, synthetic polyisoprenes, polybutadienes, styrene-butadiene copolymers, acrylonitrile-butadiene copolymers, and chloroprene and the like are valued highly in a variety of applications because of their properties of high elasticity and high coefficient of friction.

In some applications of these elastomers, as for example, inner tubes, rubber bands, and balloons, the rubber is valued for its high elasticity. In other applications, as for example, rubber tires and floor treads, the rubber is valued for both its elasticity and high coefficient of friction. In still other applications, however, the property of elasticity is highly important and the high frictional property is undesirable and is merely tolerated to take advantage of the elastic property of the rubber. Applications falling into the latter category include fluid seals in which the seal serves a wiping function against a relatively movable part, door weatherstripping, etc. In this category of applications, the high frictional property of the rubber may be greatly disadvantageous since it results in a high wear rate of the article and accordingly, a relatively short life.

This invention provides a means of treating natural rubber and certain butadiene, and isoprene-type rubbers whereby the coefficient of friction of their surfaces is substantially reduced. In accordance with my invention, the surface of these rubbers is treated directly to reduce the coefficient of friction whereby the surface is modified without altering the essential elastomeric properties of the rubber article. These objects and provisions of the invention are carried out by subjecting elastomeric compounds including natural rubber, synthetic polyisoprene elastomers, polybutadiene elastomers, styrene-butadiene copolymers, and the like with phosphorus pentafluoride or boron trichloride at a temperature of from about $-30°$ C. to the thermal degradation temperature of the elastomer for a time range from about 15 minutes to 24 hours. Other objects and advantages of the invention will be apparent from the following detailed description thereof.

It is known that certain polymeric materials which contain hydroxyl groups, such as cotton, wood and cellulose, may be treated directly with sulphur tetrafluoride to render the material less susceptible to swelling when in contact with water. Also, in the past attempts have been made to reduce the coefficient of friction of elastomers such as natural rubber, butadiene-styrene copolymers, butadiene acrylonitrile copolymers and polychloroprene by procedures which first involve altering the surface of the elastomer by grafting a polymeric material having reactive groups such as acrylates onto the rubber surface and then subjecting the grafted acrylic surface to sulphur tetrafluoride. This invention involves a surprising discovery that the coefficient of friction of certain elastomers of the butadiene-isoprene type, which do not contain hydrogen reactive groups, may have their surfaces suitably cleaned and directly subjected to gaseous phosphorus pentafluoride or boron trichloride whereby the coefficient of friction of the treated elastomer surfaces are substantially reduced without significantly affecting the elasticity or other properties thereof. However, neither phosphorus pentafluoride nor boron trichloride have been particularly useful in treating the surfaces of chloroprene or butadiene acrylonitrile-type copolymers for reducing the coefficient of friction of such surfaces. Their main use appears to be in the surface treatment of isoprene-butadiene type elastomers which have no halogen or nitrile substituents.

In general, the process of this invention involves subjecting clean surfaces of elastomers of the class comprising natural rubber, synthetic polyisoprene, polybutadiene, and butadiene-styrene copolymers to phosphorus pentafluoride and boron trichloride. If the elastomer surface is clean, no treatment preliminary to subjecting the surface to boron trichloride or phosphorus pentafluoride is necessary. Suitably clean elastomer surfaces may be obtained under normal circumstances by merely washing the elastomer surface with a hot aqueous detergent such as the commerical Tide detergent. After washing with the detergent, the elastomer surface is then rinsed with clean water and dried. The dry elastomer is then placed into a suitable reaction vessel such as one made of stainless steel, which is charged with either phosphorus pentafluoride or boron trichloride. A surface having a markedly reduced coefficient of friction is obtained in about 15 minutes to 24 hours while the reaction system including the elastomer is maintained at a temperature in the range of from $-30°$ C. to the thermal degradation temperature of the elastomer. Preferably the boron trichloride or phosphorus pentafluoride is employed in the form of a gas. Although the charging pressure may be low, in the neighborhood of atmosphere pressure, the reaction time is shortened by charging the reaction vessel with phosphorus pentafluoride or boron trichloride under pressure in the neighborhood of about 10–20# p.s.i. gauge. Although satisfactory results are obtained in employing the process at room temperature and the sub-zero temperatures down to about $-30°$ C., in some instances, the reaction time may also be reduced by employing elevated temperatures, up to the thermal degradation temperature of the elastomer. Temperatures below $-30°$ C. are not favored since the treatment tends to produce a brittle elastomer and, of course, temperatures within the elastomer thermal degradation range are unsatisfactory because of the adverse effect on the elastomer. Furthermore, the use of boron trichloride at temperatures below about 12–13° C. may result in the liquification of the boron trichloride. In this case the use of a solvent may be required for the treatment of the elastomer surface. While such reaction conditions are operable, it is preferred to have the surface treating material in the gaseous state. The following examples further illustrate the invention:

EXAMPLE I

Several cured elastomer samples having dimensions of about 1″ x 1″ x 1/16″ were compounded and molded by standard techniques having the following composition:

| Ingredient: | Parts by wt. |
| --- | --- |
| Natural rubber | 100 |
| Zinc oxide | 3 |
| Stearic acid | 3 |
| Aldol γ-naphthylamine | 1 |
| High molecular weight sulfonic acid | 2 |
| Pine tar | 1 |
| Carbon black | 63 |
| 2-mercaptothiazyl | 1 |
| Sulfur | 3 |

The elastomer sample was first washed in a hot aqueous Tide detergent, rinsed, air dried and placed in a stainless steel reaction vessel and vacuum dried at 60° C. and 1 millimeter pressure for 45 minutes. The vessel was then charged with boron trichloride at a pressure of 10# p.s.i. and maintained at 60° C. for 90 minutes. The vessel was then placed under vacuum for 60 minutes, the sample was then removed, washed in hot aqueous dilute ammonia, rinsed and air dried. The resulting elastomer was slippery to the touch. Samples were tested in the following manner. They were mounted on a 1″ square steel block weighing 50 grams. The block was attached to an Instron machine which pulled the block, elastomer side down, across a polished stainless steel surface at a steady speed of 20″ per minute. The force required to pull the sample was continuously recorded. In the case of the boron trichloride treated sample, 55 grams average force was required to pull the samples at the above rate. Based on this the coefficient of friction relative to the stainless steel surface was calculated to be 1.10. Untreated samples were tested in the same way. In this case an average force of 118 grams was required to pull the blocks at 20″ per minute. The coefficient of friction of the untreated elastomer was calculated to be 2.36. It is seen that the coefficient of friction of the treated natural rubber surface was reduced by 50%.

EXAMPLE II

Several cured elastomer samples having dimensions of 1″ x 1″ x 1/16″ were compounded and molded by standard techniques having the following composition:

| Ingredient: | Parts by wt. |
| --- | --- |
| Styrene-butadiene copolymer containing 23.5% styrene | 100 |
| Triethanolamine | 3 |
| Stearic acid | 3 |
| Carbon black | 50 |
| Benzylthiazyl disulfide | 2 |
| Tetramethyl thiuram disulfide | 3 |
| Sulfur | 1.5 |

The samples of elastomers were washed in hot aqueous Tide detergent, rinsed, air dried, placed in a stainless steel reaction vessel and vacuum dried at 60° C. and 1 millimeter pressure about 45 minutes. Again, the vessel was charged with boron trichloride to a pressure of 10# p.s.i. gauge and maintained at 60° C. for 90 minutes. The vessel was then placed under vacuum for 60 minutes to exhaust the boron trichloride. The samples were then removed, washed in hot dilute aqueous ammonia, rinsed and air dried. The samples were tested exactly as in Example I. In this case 63 grams average force were required to move the steel blocks mounted with the treated samples and 117 grams required to move the blocks mounted with untreated samples at a steady speed of 20″ per minute. The coefficient of friction of the treated elastomer was calculated to be 1.26 and the coefficient of friction of untreated elastomer was calculated to be 2.34. Again, a reduction in the coefficient of friction of the treated material was observed to be nearly 50%.

EXAMPLE III

Small samples of natural rubber elastomer were prepared of the same composition as set forth in Example I above. The samples were also washed in hot aqueous Tide detergent, air dried at 70° C., placed in a stainless steel reaction vessel and vacuum dried at 70° C. for 45 minutes at 1 millimeter pressure. This time the vessel was charged with phosphorus pentafluoride to a pressure of 20# p.s.i. and maintained at 70° C. for 1 hour. The vessel was then placed under vacuum for 30 minutes to exhaust the chamber of phosphorus pentafluoride and other reaction products. The samples were removed and washed with dilute ammonium hydroxide and water. Finally, they were dried at 70° C. The samples were very smooth and slippery to the touch. Furthermore, they were unusually glossy. The samples were tested in the following manner. They were mounted on a 1″ square steel block weighing 50 grams and pulled across a polished stainless steel surface as in the above two examples. Again, the force required to pull the samples at a steady speed of 20″ per minute was continuously recorded. The average force required to pull the blocks mounted with the treated cured filled natural rubber was 35 grams. The coefficient of friction of 0.70 is calculated from this value. The average force required to pull an untreated sample similarly mounted was 90 grams which gives a coefficient of 1.80.

EXAMPLE IV

Several cured elastomer samples of styrene-butadiene copolymers were formed in the shape of a 1″ x 1″ x 1/16″ block having the following composition:

| Ingredient: | Parts by wt. |
| --- | --- |
| Styrene-butadiene copolymer containing 23.5% styrene | 100 |
| Triethanolamine | 3 |
| Stearic acid | 3 |
| Carbon black | 50 |
| Benzothiazyl disulfide | 2 |
| Tetramethyl thiuram disulfide | 3 |
| Sulfur | 1.5 |

The samples were prepared exactly as in the Example II and charged to a stainless steel reaction vessel and vacuum dried therein. Again, the vessel was charged with phosphorus pentafluoride to a pressure of 20# p.s.i. gauge and maintained at 70° C. for 1 hour. The vessel was then placed under vacuum for 30 minutes, the samples removed and washed with dilute ammonium hydroxide and water, then air dried at 70° C. When subjected to the testing procedure set forth above, 32 grams were required to pull the treated sample at a rate of 20″ per minute. A coefficient of friction of 0.64 is calculated from this force. Ninety-five grams were required to pull the untreated sample of styrene-butadiene copolymer. As in all of the above examples, a significant reduction in the surface friction properties of the elastomer was obtained without any apparent effect on its other elastomeric properties.

In general, it was observed that the coefficient of friction of treated elastomer samples was reduced by about half or more by the process of this invention. Although it is apparent that the surface of the elastomer undergoes considerable change and probably a molecular change, the nature of this change is not definitely known.

In general, the process of this invention is effective on natural rubber, synthetic polyisoprene rubber, polybutadiene rubber, and butadiene-styrene type copolymers. No surface pretreatment is required except that improved results are obtained when elastomer surfaces are clean. In general, to obtain such an improved result it is only necessary to clean the elastomer surface with a hot detergent solution. It is also desirable to rinse or wash the sample after the treatment with a dilute ammonia solution to remove any residual boron trichloride or phosphorus pentafluoride, although this is not essential. As previously stated, the process may be practiced successfully at as low as −30° C. or up to the thermal degradation temperature of the elastomer. It is not desirable to practice the process in the vicinity of the thermal degradation temperature though, because of adverse effects of the heat on the other physical properties of the elastomer. It will be appreciated, of course, that the temperature at which a substantial thermal degradation of the elastomer occurs to affect its properties adversely will vary with the various elastomers. As a practical matter, no advantage is gained by practicing the process in excess of 150° C. As previously indicated, satisfactory products having a markedly reduced coefficient of friction are obtained when the elastomer is subjected to gaseous phosphorus pentafluoride or boron trichloride for about 15 minutes when elevated temperatures and pressures are used as previously described. Although substantial reduction of coefficient of friction is obtained in a few seconds of time, no significant advantage is obtained when the duration of treatment exceeds about 24 hours.

The process of this invention is operative with both cured and uncured elastomers as well as filled and unfilled elastomers. In some instances it is desirable to treat uncured elastomers by means of the process of this invention while employing suitable temperatures to effect simultaneously cure of the elastomer. In general, it is preferable to employ phosphorus pentafluoride or boron trichloride in their gaseous state in the process, although it will be readily apparent to those skilled in the art that either may be applied to the elastomer surface in a suitable solvent solution which will not have a solvent or other adverse effect on the elastomer.

While this invention has been described in terms of a preferred embodiment it is to be understood that the invention is not limited thereby except as defined by the following claims.

I claim:
1. The process which comprises directly contacting an elastomer taken from the class consisting of natural rubber, synthetic polyisoprene elastomer, polybutadiene and butadiene-styrene copolymers with a compound taken from the group consisting of phosphorus pentafluoride and boron trichloride, thereby substantially reducing the coefficient of friction of the elastomer surface without substantial change in the physical form thereof.

2. The process of claim 1 wherein phosphorus pentafluoride is gaseous.

3. The process of claim 1 wherein boron trichloride is gaseous.

4. The process of reducing the coefficient of friction of an elastomer taken from the group consisting of natural rubber, synthetic polyisoprene rubber, polybutadiene rubber and butadiene-styrene copolymers, without previously altering the chemical structure of the elastomer surface to change the physical form thereof, which comprises, contacting the elastomer surface with a gaseous material taken from the group consisting of phosphorus pentafluoride and boron trichloride under substantially anhydrous conditions at a temperature between about −30° C. and the thermal degradation temperature of the elastomer.

5. The process of claim 4 in which the elastomer is natural rubber.

6. The process of claim 4 in which the elastomer is butadiene-styrene copolymer rubber.

7. An elastomer produced in accordance with the process of claim 4.

References Cited

UNITED STATES PATENTS 3,345,348  10/1967  Tennenhouse _____ 260—85.1

JOSEPH L. SCHOFER, *Primary Examiner.*

L. EDELMAN, *Assistant Examiner.*

U. S. Cl. X.R.

260—94.7, 816